(12) United States Patent
Wu et al.

(10) Patent No.: US 9,137,193 B2
(45) Date of Patent: Sep. 15, 2015

(54) INCREASING THE RELEVANCE OF DIGEST EMAILS TO GROUP MEMBERS

(71) Applicant: LinkedIn Corporation, Mountain View, CA (US)

(72) Inventors: Xiaohui Wu, Mountain View, CA (US); Ian M. McCarthy, Mountain View, CA (US); Mark E. Pascual, Mountain View, CA (US); Vinh V. To, Mountain View, CA (US)

(73) Assignee: LinkedIn Corporation, Mountain View, CA (US)

( * ) Notice: Subject to any disclaimer, the term of this patent is extended or adjusted under 35 U.S.C. 154(b) by 300 days.

(21) Appl. No.: 13/707,481

(22) Filed: Dec. 6, 2012

(65) Prior Publication Data

US 2014/0164526 A1   Jun. 12, 2014

(51) Int. Cl.
*H04L 12/58*   (2006.01)

(52) U.S. Cl.
CPC .............. *H04L 51/32* (2013.01); *H04L 12/586* (2013.01); *H04L 12/588* (2013.01)

(58) Field of Classification Search
CPC ............................ H04L 12/586; H04L 12/588
USPC ................. 709/206, 203, 217, 219, 223, 224
See application file for complete search history.

(56) References Cited

U.S. PATENT DOCUMENTS

| | | | |
|---|---|---|---|
| 6,816,884 B1* | 11/2004 | Summers | 709/206 |
| 8,452,880 B2* | 5/2013 | Jain | 709/229 |
| 2004/0064515 A1* | 4/2004 | Hockey | 709/206 |
| 2005/0137996 A1* | 6/2005 | Billsus et al. | 707/1 |
| 2007/0174406 A1* | 7/2007 | Morris et al. | 709/207 |
| 2008/0098125 A1* | 4/2008 | Wang Baldonado et al. | 709/231 |
| 2010/0250691 A1* | 9/2010 | Tomkow | 709/206 |
| 2013/0070758 A1* | 3/2013 | Sheth et al. | 370/352 |
| 2013/0326213 A1* | 12/2013 | Murphy et al. | 713/155 |
| 2013/0346525 A1* | 12/2013 | Chen et al. | 709/206 |
| 2014/0115066 A1* | 4/2014 | Massand | 709/206 |
| 2014/0280611 A1* | 9/2014 | Banatwala et al. | 709/206 |

* cited by examiner

*Primary Examiner* — Lashonda Jacobs
(74) *Attorney, Agent, or Firm* — Park, Vaughan, Fleming & Dowler LLP; Chia-Hsin Suen

(57) ABSTRACT

The disclosed embodiments provide a system that facilitates access to content associated with a group. During operation, the system provides, to a first user in the group, a digest email comprising a set of links to the content. Next, the system increases a relevance of the digest email to the first user by selecting a subject header for the digest email based on usage patterns associated with at least one of the first user and one or more other users related to the first user.

20 Claims, 5 Drawing Sheets

INCREASING THE RELEVANCE OF DIGEST EMAILS TO GROUP MEMBERS

BACKGROUND

1. Field

The disclosed embodiments relate to digest emails for groups. More specifically, the disclosed embodiments relate to techniques for increasing the relevance of the digest emails to members of the groups.

2. Related Art

Digest emails may be used by groups, organizations, and/or online communities to provide a "snapshot" of content created and/or modified during a given period. For example, a social network may send daily and/or weekly digest emails containing links to posts, articles, discussions, and/or comments associated with a group to members of the group. After the digest emails are received, the members may use the digest emails to view the content and/or access the social network by selecting the links within the digest emails.

However, a digest email may contain large amounts of content, particularly if the digest email is associated with an active group and/or organization. In turn, recipients of the digest email are likely to lose interest in the digest email before they find content that is relevant and/or interesting to them. For example, the digest email may include descriptions of and/or links to tens or hundreds of discussions, articles, and/or posts generated by members of the group and/or organization. In addition, the subject header of the digest email may include a generic description of the time period, amount of content (e.g., number of posts, discussions, articles, etc.), group, and/or other attributes associated with the digest email. Because the subject header does not describe content that may be relevant to a particular user, the user may delete the digest email instead of opening the digest email. Conversely, the user may be unable to find relevant content in the digest email after opening the digest email. In both cases, effective and/or efficient access to content that is relevant to the user may be precluded by a large amount of content and/or a lack of personalization in the digest email.

Consequently, use of digest emails may be facilitated by techniques for increasing the relevance of the digest emails to recipients of the digest emails.

SUMMARY

The disclosed embodiments provide a system that facilitates access to content associated with a group. During operation, the system provides, to a first user in the group, a digest email comprising a set of links to the content. Next, the system increases a relevance of the digest email to the first user by selecting a subject header for the digest email based on usage patterns associated with at least one of the first user and one or more other users related to the first user.

In some embodiments, the system also creates a featured section in the digest email based on the usage patterns.

In some embodiments, the featured section is located at a top of the digest email.

In some embodiments, selecting the subject header for the digest email based on the usage patterns involves identifying a preference of the first user for a subset of the content, and using the subset of the content to create the subject header.

In some embodiments, the preference of the first user for the subset of the content is based on at least one of:
 (i) a connection of the first user to a second user associated with creation of the content;
 (ii) a subscription of the first user to the second user; and
 (iii) an importance of a topic associated with the subset of the content to the first user.

In some embodiments, the subject header includes a name of the second user, the topic, and/or a title associated with the subset of the content.

In some embodiments, selecting the subject header for the digest email based on the usage patterns involves identifying a preference of the one or more other users for a subset of the content, and using the subset of the content to create the subject header.

In some embodiments, the one or more other users are related to the first user based on membership in the group by the one or more other users and/or similarities between the first user and the one or more other users.

In some embodiments, the preference of the one or more other users for the subset of the content is identified based on a selection of the subset of the content by the one or more other users during a time period associated with the digest email.

In some embodiments, the content is at least one of an article, a discussion, a comment, and a post.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Figure 1:
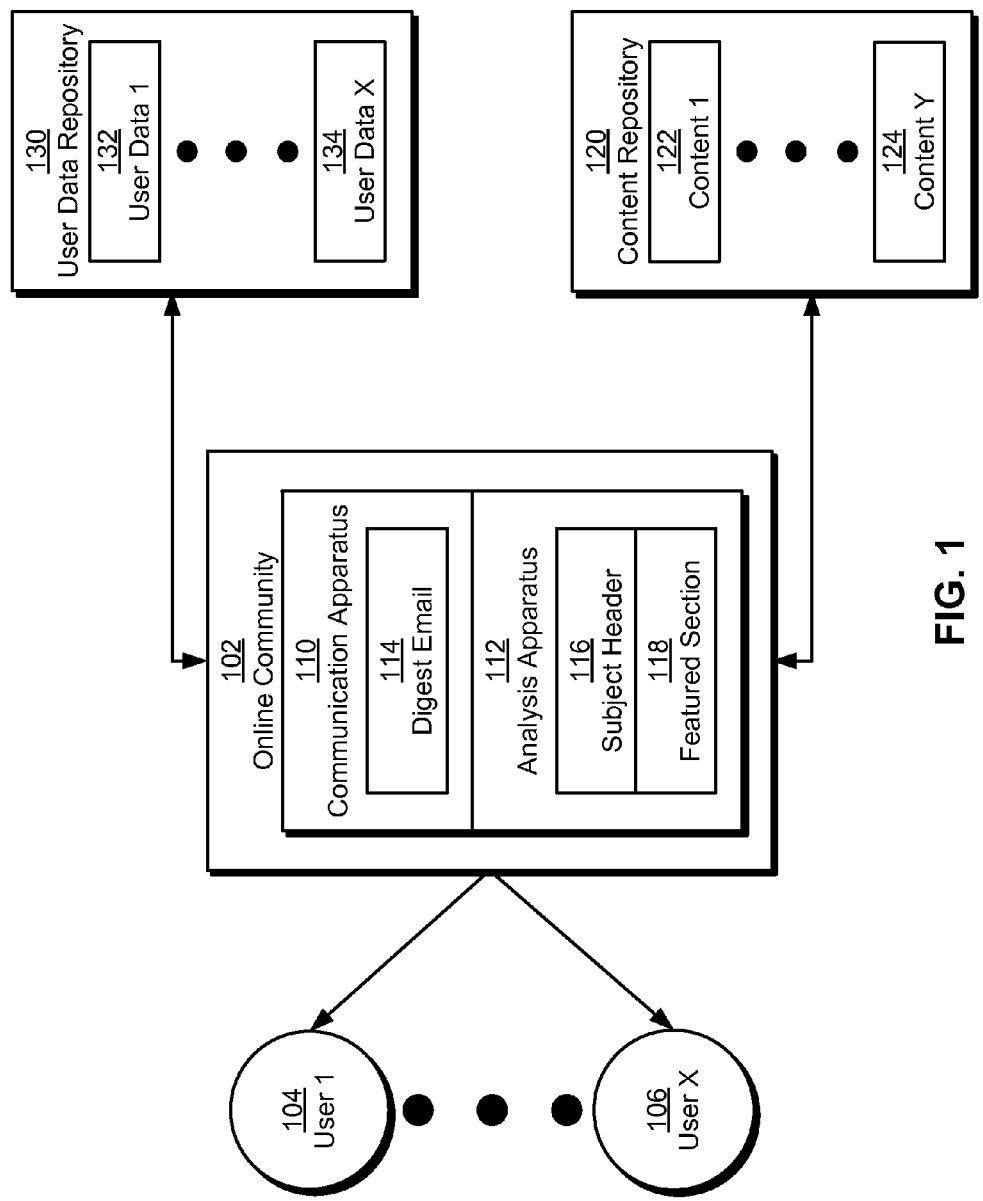
FIG. 1 shows a schematic of a system in accordance with the disclosed embodiments.

The disclosed embodiments provide a method and system for increasing the relevance of digest emails to users who are members of groups. As shown in FIG. 1, a digest email 114 for the group may be sent from an online community 102 hosting the group to a set of users (e.g., user 1 104, user X 106) in the group to enable access to content (e.g., content 1 122, content Y 124) associated with the group and/or online community 102 by the users. For example, online community 102 may deliver a daily and/or weekly digest email 114 containing a list of links (e.g., hyperlinks) to the content to subscribers of digest email 114. The users may access the content by opening digest email 114 and selecting one or more links to navigate to a website, web application, social networking service, and/or other web-based service for hosting the content provided by online community 102.

More specifically, a communication apparatus 110 associated with online community 102 may deliver digest email 114 to users that have subscribed to digest emails for the group. For example, communication apparatus 110 may be an electronic mailing list server that delivers digest email 114 and/or other digest emails for the group to the users. Communication apparatus 110 may also provide an email address to which the users may send commands to subscribe and/or unsubscribe to the digest emails, temporarily halt the delivery of the digest emails, change the frequency with which the digest emails are delivered, and/or change other preferences and/or settings related to the delivery of the digest emails. Alternatively, communication apparatus 110 may provide a website and/or other web-based service that the users may access to change preferences and/or settings related to the users' receipt of digest emails.

The content may include posts, articles, comments, discussions, and/or other user-created content associated with the group. For example, each piece of content may be created by one or more users and relate to a common topic, area of interest, identity, and/or purpose associated with the group. To access, subscribe, and/or contribute to the content, the users may join the group within online community 102. For example, a user may become a member of the group by adding the group to his/her user profile with online community 102 and/or obtaining approval to join the group by a manager and/or administrator of the group.

After a piece of content associated with the group is created, the content may be stored in content repository 120 for subsequent retrieval and modification and/or the creation of additional content (e.g., responses, comments, etc.) related to the content. For example, the content may be stored in a relational database and provided to the users through a web-based interface associated with online community 102. The users may use the web-based interface to view existing content and provide comments, likes, posts, articles, and/or other additions and/or modifications to the content. The users may additionally create new content by starting new discussions and/or posting new articles through the web-based interface. Additions and/or modifications to content for the group over a pre-specified period (e.g., daily, weekly, etc.) may be aggregated into a set of links within a digest email (e.g., digest email 114) for the pre-specified period, and the digest email may be sent to the users to update the users with activity in the group during the pre-specified period.

Those skilled in the art will appreciate that the users may have trouble finding and/or accessing relevant content within digest email 114, particularly if the activity level of the group is high. For example, members of the group may generate hundreds of new posts, discussions, and/or articles on a weekly basis. A user may thus have trouble finding relevant and/or interesting posts, discussions, and/or articles within a long digest email 114 containing an arbitrarily sorted (e.g., alphabetically, chronologically, etc.) list of links to the posts, discussions, and/or articles. In turn, the user may lose interest in digest email 114 before the user finds content worth accessing through digest email 114.

For example, digest email 114 may include a subject header 116 that generically describes the timeframe (e.g., the day(s) covered by digest email 114) and/or amount of content (e.g., number of posts, discussions, articles, etc.) associated with digest email 114. Because subject header 116 is not personally relevant to the user, the user may not develop enough interest to open digest email 114. Even if the user decides to open digest email 114, the user may be unable to identify relevant and/or interesting content within digest email 114 in a timely fashion. As a result, digest email 114 may be inefficient and/or ineffective at capturing the user's attention and/or promoting access to online community 102 by the user.

In one or more embodiments, the system of FIG. 1 includes functionality to generate digest emails (e.g., digest email 114) that are personally relevant to users (e.g., user 1 104, user X 106) receiving the digest emails. The increased relevance may increase the users' interest in the digest emails, resulting in greater access to the content, group, and/or online community 102 by the users and an increase in the value of online community 102 to the users.

To improve the relevance of digest email 114 to a particular user, an analysis apparatus 112 provided by online community 102 may customize digest email 114 based on usage patterns associated with the user and/or one or more other users related to the user. First, analysis apparatus may identify the usage patterns by analyzing user data (e.g., user data 1 132, user data X 134), such as user profiles, preferences, and/or behavior for the user and/or other users, from user data repository 130.

Next, analysis apparatus 112 may apply the usage patterns to content associated with digest email 114 to tailor subject header 116 to the user. In particular, analysis apparatus 112 may identify a preference of the user for a subset of the content and use the subset of the content to create subject header 116.

The user's preference for the subset of the content may be based on a connection of the user to another associated with creation of the content. For example, the two users may be connected to each other within online community 102 by a two-way relationship (e.g., friendship, professional relationship, family relationship, marriage, etc.) that allows the users to communicate and/or share content with one another. As another example, the user's preference for the subset of the content may be based on a subscription of the user to the other user. In particular, the user may form a one-way relationship with the other user by "following" the activities of the other user (e.g., a celebrity, expert, leader, etc.) in online community 102, which allows the user to receive content from the other user but may limit the amount of communication the user may perform with the other user. As yet another example, the user's preference for the subset of the content may be based on an importance of a topic associated with the subset of the content to the user. Specifically, the importance of the topic to the user may be identified from the user's subscription to a tag and/or category of content associated with the topic.

To select and/or generate subject header 116 based on the user's preference for the subset of the content, analysis apparatus 112 may include information related to the subset of the content in subject header 116. For example, analysis apparatus 112 may include the name of the other user to which the user is connected and/or subscribed, the topic, and/or a title associated with the subset of the content in subject header 116. If the subset of the content includes multiple posts, discussions, articles, comments, and/or other pieces of content that match the user's preference, analysis apparatus 112 may chronologically sort the subset of the content and include information associated with the most recent pieces of content in subject header 116. Generating and/or selecting subject headers of digest emails to individual users based on the users' preferences for content related to the digest emails is discussed in further detail below with respect to FIG. 2B.

Alternatively, analysis apparatus 112 may identify a preference of other user(s) related to the user for a subset of the content and use that subset of the content to create subject header 116. The other user(s) may be related to the user based on their membership in the same group and/or other similarities between the user and the other user(s). For example, user data from user data repository 130 may indicate that the user and other user(s) have common interests, backgrounds, skill sets, lifestyles, characteristics, usage patterns, and/or preferences.

In addition, analysis apparatus 112 may identify the preference of the other user(s) for the subset of the content based on selections of the subset of the content by the other user(s) during a time period associated with digest email 114. For example, the other user(s) may request content associated with digest email 114 through a website associated with online community 102 and/or one or more daily digest emails for the group sent during a week covered by digest email 114. After the week has passed, analysis apparatus 112 may aggregate requests for the content, order the accessed content in descending order of popularity (e.g., based on number of requests for the content), and include the title of the most popular piece of content in subject header 116. Generating and/or selecting subject headers of digest emails to individual users based on the preferences of other users related to the users for content related to the digest emails is discussed in further detail below with respect to FIG. 2A.

To further facilitate access to the content by the user, analysis apparatus 112 may also create a featured section 118 in digest email 114 based on the usage patterns and/or preferences of the user and/or other user(s). For example, analysis apparatus 112 may add featured section 118 to the top of digest email 114 for easy access and/or identification by the user, and include links to content associated with subject header 116 and/or the preferences of the user and/or other user(s) within featured section 118. Consequently, subject header 116 may capture the user's attention and/or interest, while featured section 118 may allow the user to easily and/or efficiently identify and access personally relevant content through digest email 114. In other words, subject header 116 and/or featured section 118 may provide a personalized "snapshot" of general activity within the group to the user, thus increasing both the use of online community 102 by the user and the value of online community 102 to the user.

Those skilled in the art will appreciate that the system of FIG. 1 may be implemented in a variety of ways. First, communication apparatus 110 and analysis apparatus 112 may be provided by the same hardware and/or software component(s), or they may execute independently from one another. For example, the functionality of communication apparatus 110 and analysis apparatus 112 may be implemented by a single server and/or software component, or the email-delivery actions of communication apparatus 110 may be separated from the email-customization actions of analysis apparatus 112 using multiple hardware and/or software components.

Second, analysis apparatus 112 may use a number of techniques to customize subject header 116 and/or featured section 118 for the user. For example, analysis apparatus 112 may create subject header 116 and/or featured section 118 to reflect the user's preferences and the preferences of the other user(s) with respect to the content. In other words, subject header 116 and/or featured section 118 may be associated with content that is both popular with the other user(s) and related to the user's interests and/or content preferences. Conversely, analysis apparatus 112 may select subject header 116 and/or featured section 118 based on curated content, such as content selected and/or highlighted by a manager of the group.

Figure 2A:
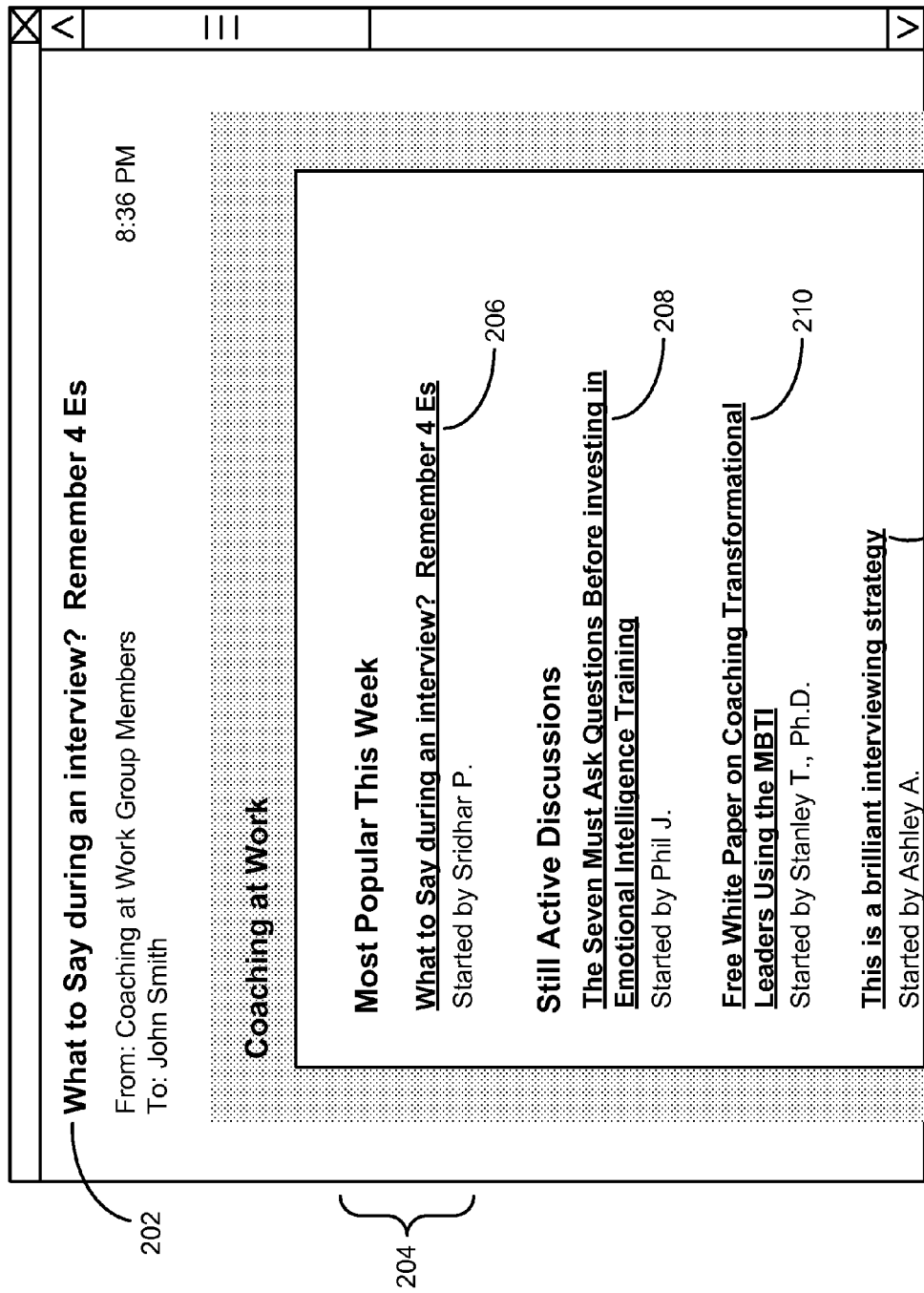
FIG. 2A shows an exemplary screenshot in accordance with the disclosed embodiments.

FIG. 2A shows an exemplary screenshot in accordance with disclosed embodiments of the invention. More specifically, FIG. 2A shows an exemplary screenshot of a digest email for content associated with a group (e.g., "Coaching at Work"), such as digest email 114 of FIG. 1. As mentioned above, the digest email may include a subject header 202 (e.g., "What to Say during an interview? Remember 4 Es") and a featured section 204 (e.g., "Most Popular This Week") that are customized to the user (e.g., "John Smith") receiving the digest email.

Subject header 202 and featured section 204 may be associated with a subset of the content that is preferred by one or more other users related to the user. For example, subject header 202 may include the title of an article that is popular with users in the same group and/or users that have similar interests, preferences, characteristics, and/or usage patterns as the user. In addition, featured section 204 may be located at the top of the digest email and include a link 206 to the article. A set of links 208-212 to other content associated with the group may then be placed below featured section 204 to enable access to the other content by the user.

Subject header 202 and/or featured section 204 may be selected based on a preference for the subset of the content by the other user(s). For example, the number of requests for the article and/or other content associated with the group may be aggregated over a weekly period associated with the digest email. The other user(s) may make the requests by selecting links in daily digest emails for the group and/or accessing a website and/or web application hosting the content. The content may then be sorted based on the number of requests for the content, and the sorted content may indicate that the article is associated with the highest number of requests during the weekly period. Because the article is popular with the other user(s), subject header 202 and/or featured section 204 may be more relevant and/or interesting to the user than a generic subject header and/or digest email that is sent to all members of the group.

Figure 2B:
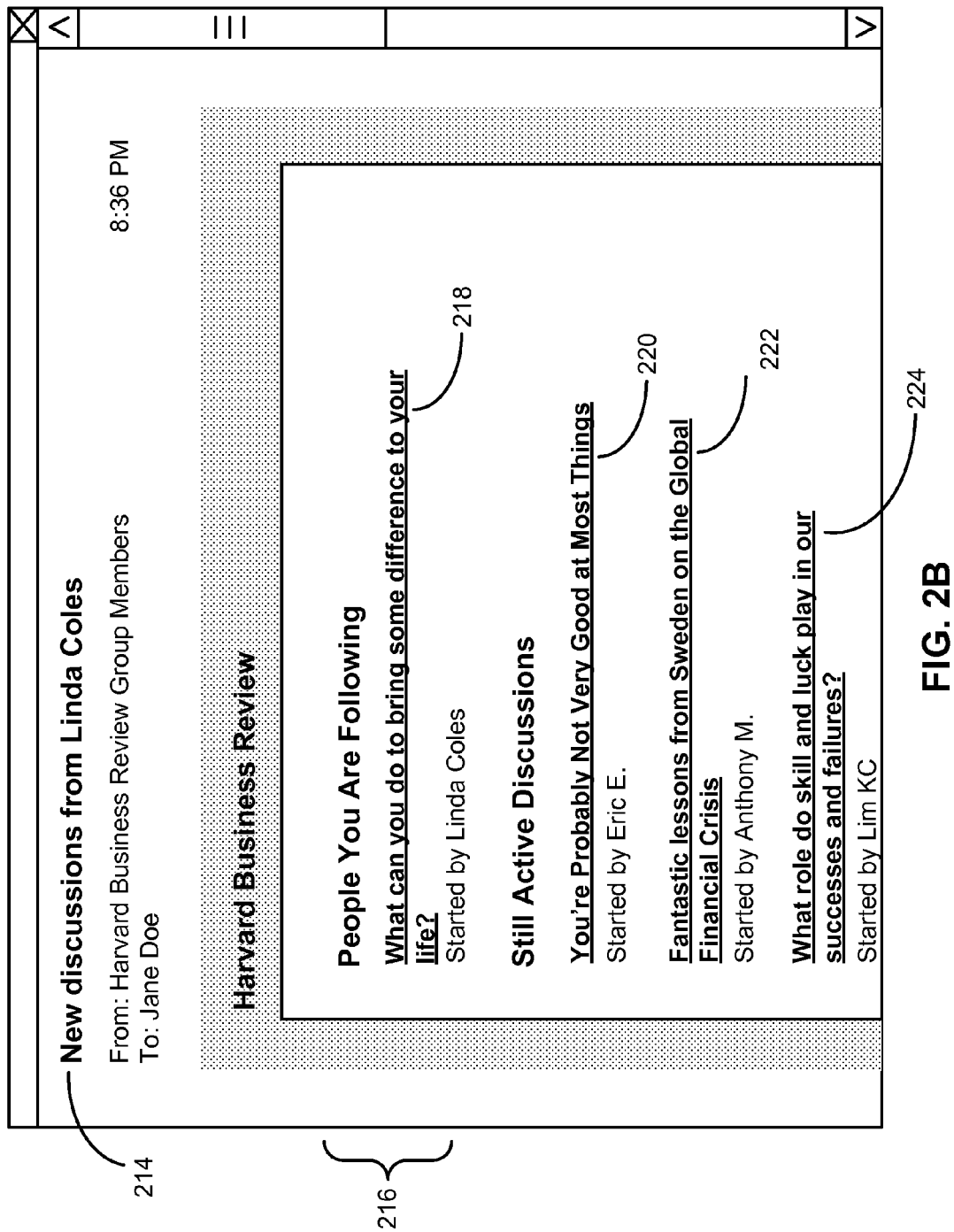
FIG. 2B shows an exemplary screenshot in accordance with the disclosed embodiments.

FIG. 2B shows an exemplary screenshot in accordance with the disclosed embodiments. More specifically, FIG. 2B shows an exemplary screenshot of a digest email for content associated with a group (e.g., "Harvard Business Review"). As with the digest email of FIG. 2A, the digest email of FIG. 2B includes a subject header 214 (e.g., "New discussions from Linda Coles") and featured section 216 (e.g., "People You Are Following") that are customized to the user (e.g., "Jane Doe") receiving the digest email. Featured section 216 may be located at the top of the digest email and include a link 218 (e.g., "What can you do to bring some difference to your life?") to the article, and links 220-224 to other content associated with the group and/or digest email may appear below featured section 216 in the digest email.

However, unlike the digest email of FIG. 2A, the digest email of FIG. 2B may be customized based on the preference of the individual user to whom the email is addressed. For example, the user's preference for content from other users may be identified based on the connection and/or subscription of the user to the other users. Next, content (e.g., discussions, posts, articles, comments, etc.) created by the other users during a time period for the digest email may be identified and sorted in reverse chronological order. Alternatively, the content may be sorted based on other criteria, such as the popularity of the content with similar users and/or the group during the time period. The sorted content may then indicate that the discussion(s) created by a second user (e.g., "Linda Coles") are the most recent and/or popular among content created by the other users within the time period, and the name of the second user may be included in subject header 214. Because the user has expressed an explicit interest in content created by the second user, subject header 214 and/or featured section 216 may encourage the user to access the group by opening the digest email and selecting link 218.

Figure 3:
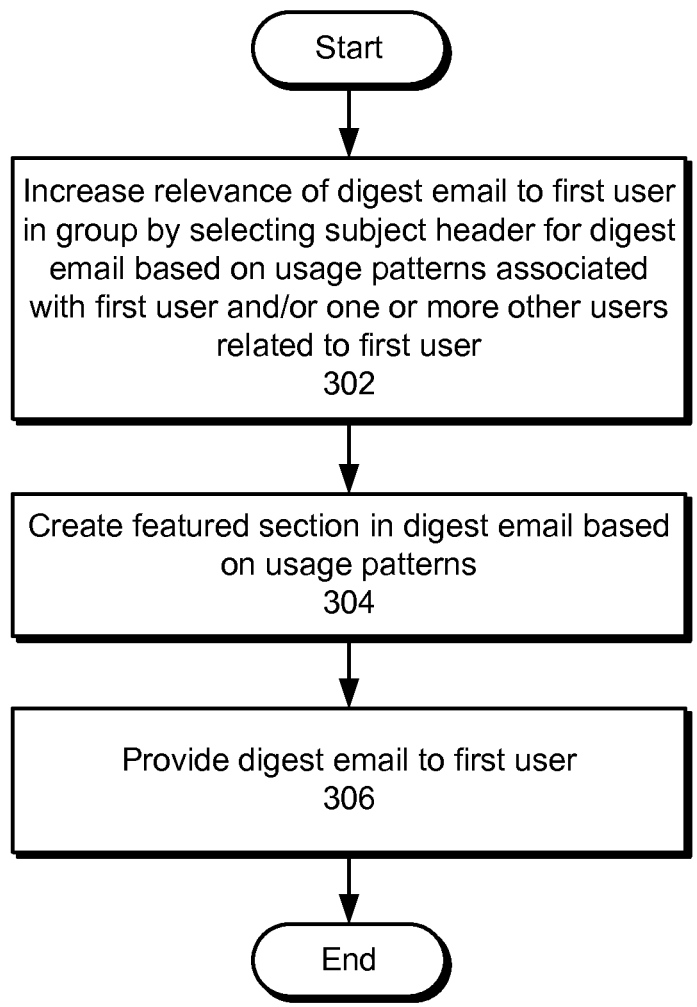
FIG. 3 shows a flowchart illustrating the process of facilitating access to content associated with a group in accordance with the disclosed embodiments.

FIG. 3 shows a flowchart illustrating the process of facilitating access to content associated with a group in accordance with disclosed embodiments of the invention. In one or more embodiments, one or more of the steps may be omitted, repeated, and/or performed in a different order. Accordingly, the specific arrangement of steps shown in FIG. 3 should not be construed as limiting the scope of the technique.

Initially, the relevance of a digest email to a first user is increased by selecting a subject header for the digest email based on usage patterns associated with the first user and/or one or more other users related to the first user (operation 304). The digest email may be generated periodically (e.g., daily, weekly, etc.) to update the user with recent activity in a group of which the first user is a member. As a result, the digest email may contain a set of links to content generated by members of the group during the time period for the digest email.

Illustratively, the subject header may be created based on a preference for a subset of the content by the first user and/or the other user(s). For example, the user's preference for the subset of the content may be based on the connection of the first user to a second user associated with creation of the content, a subscription of the first user to the second user, and/or an importance of a topic associated with the subset of the content to the first user. The subject header may thus include the name of the second user, the topic, and/or a title associated with the subset of the content.

On the other hand, the preference of the other user(s) for the subset of the content may be based on the selection of the subset of the content by the other user(s) during a time period associated with the digest email. For example, the other user(s) may request the subset of the content over other content from the group through a web-based service associated with the group and/or a link in a digest email with a shorter time period than the digest email.

A featured section is also created in the digest email based on the usage patterns (operation 304). For example, the featured section may be located at the top of the digest email and include a link to the subset of the content. The subject header may thus capture the user's attention and/or interest, while the featured section may facilitate access to content that is relevant to the first user through the digest email.

Finally, the digest email is provided to the first user (operation 302). Because the subject header and/or featured section of the digest email are tailored to the first user, the first user may be more likely to open the digest email and/or access the content through one or more links in the digest email.

Figure 4:
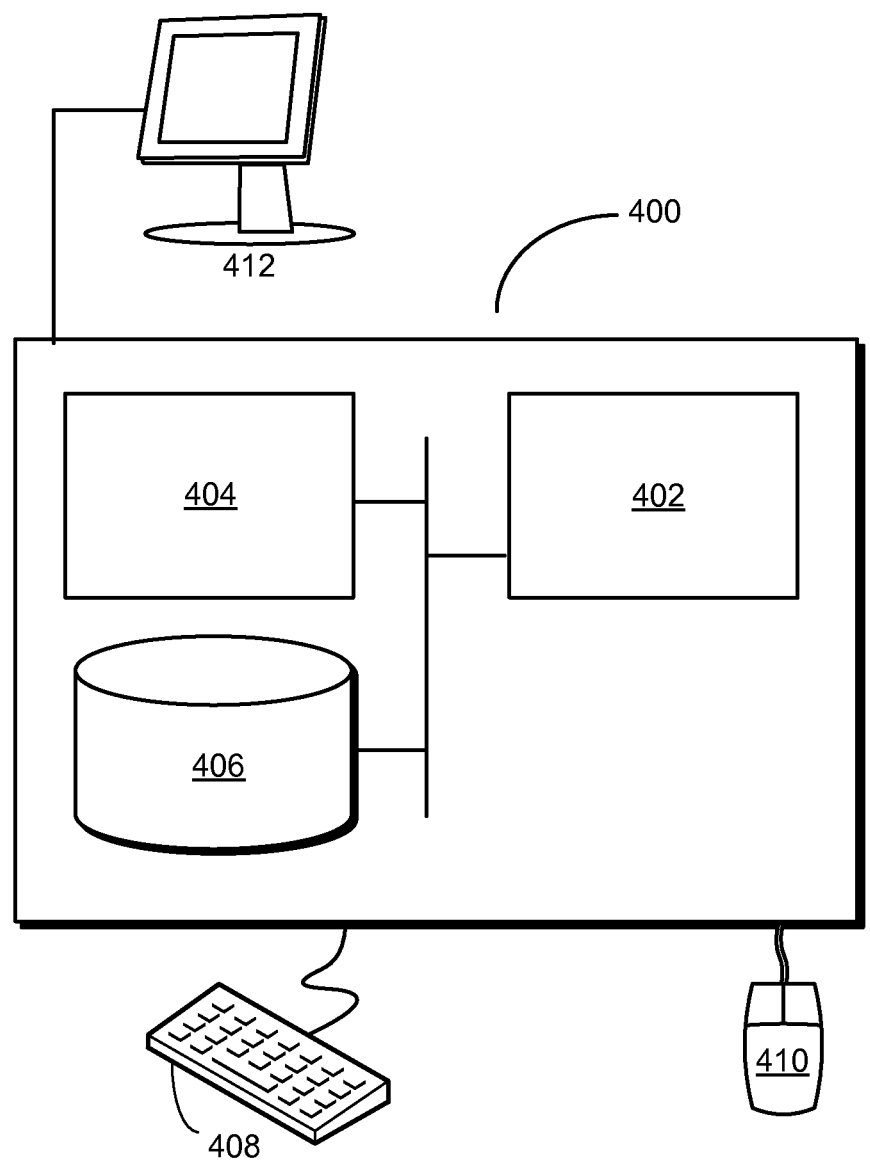
FIG. 4 shows a computer system in accordance with the disclosed embodiments.

FIG. 4 shows a computer system 400 in accordance with the disclosed embodiments. Computer system 400 includes a processor 402, memory 404, storage 406, and/or other components found in electronic computing devices.

Processor 402 may support parallel processing and/or multi-threaded operation with other processors in computer system 400. Computer system 400 may also include input/output (I/O) devices such as a keyboard 408, a mouse 410, and a display 412.

Computer system 400 may include functionality to execute various components of the present embodiments. In particular, computer system 400 may include an operating system (not shown) that coordinates the use of hardware and software resources on computer system 400, as well as one or more applications that perform specialized tasks for the user. To perform tasks for the user, applications may obtain the use of hardware resources on computer system 400 from the operating system, as well as interact with the user through a hardware and/or software framework provided by the operating system.

In one or more embodiments, computer system 400 provides a system for facilitating access to content associated with a group. The system includes a communication apparatus that provides, to a first user in the group, a digest email comprising a set of links to the content. The system also includes an analysis apparatus that increases a relevance of the digest email to the user by selecting a subject header for the digest email based on usage patterns associated with at least one of the first user and one or more other users related to the first user. The analysis apparatus may also create a featured section in the digest email based on the usage patterns.

In addition, one or more components of computer system 400 may be remotely located and connected to the other components over a network. Portions of the present embodiments (e.g., communication apparatus, analysis apparatus, etc.) may also be located on different nodes of a distributed system that implements the embodiments. For example, the present embodiments may be implemented using a cloud computing system that generates and/or customizes digest emails to members of a group based on usage patterns associated with individual members and/or similar members.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-implemented method for facilitating access to content associated with a group of users, comprising:
creating a subject header for a digest email based on usage patterns associated with at least one of a first user in the group and one or more other users related to the first user, wherein the subject header comprises a topic associated with the content to increase a relevance of the digest email to the first user; and
providing, to the first user in the group, the digest email comprising the subject header and a set of links to the content, wherein the content comprises user-created content related to a common purpose associated with the group.

2. The computer-implemented method of claim 1, further comprising:
creating a featured section in the digest email based on the usage patterns.

3. The computer-implemented method of claim 2, wherein the featured section is located at a top of the digest email.

4. The computer-implemented method of claim 1, wherein selecting the subject header for the digest email based on the usage patterns comprises:
identifying a preference of the first user for a subset of the content; and
using the subset of the content to create the subject header.

5. The computer-implemented method of claim 4, wherein the preference of the first user for the subset of the content is based on at least one of:
a connection of the first user to a second user associated with creation of the content;
a subscription of the first user to the second user; and
an importance of a topic associated with the subset of the content to the first user.

6. The computer-implemented method of claim 5, wherein the subject header comprises at least one of:
a name of the second user;
the topic; and
a title associated with the subset of the content.

7. The computer-implemented method of claim 1, wherein selecting the subject header for the digest email based on the usage patterns comprises:
identifying a preference of the one or more other users for a subset of the content; and
using the subset of the content to create the subject header.

8. The computer-implemented method of claim 7, wherein the one or more other users are related to the first user based on at least one of:
membership in the group by the one or more other users; and
similarities between the first user and the one or more other users.

9. The computer-implemented method of claim 8, wherein the preference of the one or more other users for the subset of the content is identified based on a selection of the subset of the content by the one or more other users during a time period associated with the digest email.

10. The computer-implemented method of claim 1, wherein the content is at least one of an article, a discussion, a comment, and a post.

11. A system for facilitating access to content associated with a group of users, comprising:
a communication apparatus configured to provide, to a first user in the group, a digest email comprising a subject header and a set of links to the content, wherein the content comprises user-created content related to a common purpose associated with the group; and
an analysis apparatus configured to increase a relevance of the digest email to the first user by creating a subject header for the digest email based on usage patterns associated with at least one of the first user and one or more other users related to the first user, wherein the subject header comprises a topic associated with the content.

12. The system of claim 11, wherein the analysis apparatus is further configured to:
create a featured section in the digest email based on the usage patterns.

13. The system of claim 11, wherein selecting the subject header for the digest email based on the usage patterns comprises:
identifying a preference of the first user for a subset of the content; and
using the subset of the content to create the subject header.

14. The system of claim 13, wherein the preference of the first user for the subset of the content is based on at least one of:
a connection of the first user to a second user associated with creation of the content;
a subscription of the first user to the second user; and
an importance of a topic associated with the subset of the content to the first user.

15. The system of claim 11, wherein selecting the subject header for the digest email based on the usage patterns comprises:
identifying a preference of the one or more other users for a subset of the content; and
using the subset of the content to create the subject header.

16. The system of claim 15, wherein the one or more other users are related to the first user based on at least one of:
membership in the group by the one or more other users; and
similarities between the first user and the one or more other users.

17. A computer-readable storage medium storing instructions that when executed by a computer cause the computer to perform a method for facilitating access to content associated with a group of users, the method comprising:
creating a subject header for a digest email based on usage patterns associated with at least one of a first user in the group and one or more other users related to the first user, wherein the subject header comprises a topic associated with the content to increase a relevance of the digest email to the first user; and
providing, to the first user in the group, the digest email comprising the subject header and a set of links to the content, wherein the content comprises user-created content related to a common purpose associated with the group.

18. The computer-readable storage medium of claim 17, the method further comprising:
creating a featured section in the digest email based on the usage patterns.

19. The computer-readable storage medium of claim 17, wherein selecting the subject header for the digest email based on the usage patterns comprises:
identifying a preference of the first user for a subset of the content; and
using the subset of the content to create the subject header.

20. The computer-readable storage medium of claim 17, wherein selecting the subject header for the digest email based on the usage patterns comprises:
identifying a preference of the one or more other users for a subset of the content; and
using the subset of the content to create the subject header.

* * * * *